(12) United States Patent
Rice

(10) Patent No.: US 11,968,968 B1
(45) Date of Patent: Apr. 30, 2024

(54) DEVICE AND METHODS OF USE FOR DETERMINING LURE DEPTH WHILE TROLLING

(71) Applicant: Jeremy Rice, Hudson, OH (US)

(72) Inventor: Jeremy Rice, Hudson, OH (US)

( * ) Notice: Subject to any disclaimer, the term of this patent is extended or adjusted under 35 U.S.C. 154(b) by 434 days.

(21) Appl. No.: 17/494,973

(22) Filed: Oct. 6, 2021

Related U.S. Application Data

(60) Provisional application No. 63/088,913, filed on Oct. 7, 2020.

(51) Int. Cl.
A01K 91/20 (2006.01)

(52) U.S. Cl.
CPC .................................... A01K 91/20 (2013.01)

(58) Field of Classification Search
CPC ..................................................... A01K 91/20
USPC .................... 33/1 N, 301, 354, 713, 719, 282
See application file for complete search history.

(56) References Cited

U.S. PATENT DOCUMENTS

| | | | | |
|---|---|---|---|---|
| 373,627 A * | 11/1887 | Wickham et al. | ....... | G01C 5/00 33/282 |
| 2,518,907 A * | 8/1950 | Konwal | ............... | G01C 13/008 116/297 |
| 2,762,129 A * | 9/1956 | Morgan | ................. | A01K 89/00 33/753 |
| 3,253,337 A * | 5/1966 | Ebert | ..................... | A01K 91/20 33/1 LE |
| 3,786,586 A * | 1/1974 | Swan | ..................... | A01K 91/20 33/563 |
| 3,959,885 A * | 6/1976 | Edmiston | ............... | A01K 91/08 43/25 |
| 5,131,165 A * | 7/1992 | Benson | .................... | G01B 7/26 43/25 |
| 5,187,878 A * | 2/1993 | Kuttner | ................. | A01K 91/20 43/25 |
| 5,191,719 A * | 3/1993 | Kitt | ........................ | G01B 13/14 73/300 |
| 5,309,664 A * | 5/1994 | Wright | .................. | A01K 91/02 43/26.1 |
| 5,396,709 A * | 3/1995 | Swan, Jr. | ............... | G01C 17/38 33/356 |
| 7,591,079 B1 * | 9/2009 | Marcum | .................. | G01C 9/02 33/534 |
| 11,473,893 B2 * | 10/2022 | Silkworth | ............. | G01B 7/026 |
| 2005/0138857 A1 * | 6/2005 | Markley | ................ | A01K 91/02 43/26.2 |
| 2005/0166411 A1 * | 8/2005 | Scorvo | ................. | A01K 87/007 33/471 |

* cited by examiner

*Primary Examiner* — George B Bennett
(74) *Attorney, Agent, or Firm* — GUGLIOTTA & GUGLIOTTA LPA

(57) ABSTRACT

A measuring device is provided for use in a method for determining the depth of a trolled lure. The measuring device has an angular scale divided into degrees to measure a dive angle and a bubble level affixed thereto for calibrating the angular scale relative to the horizon. A register pin affixed at a fulcrum of the angular scale forms a center point for a fishing line to rotate about in order to measure a dive angle. The register pin further includes a flange to ensure the fishing line is retained on an outer diameter of the register pin while the dive angle measurement is taken. A mounting device is provided adapted for affixing the measuring device within a boat in a manner that allows for leveling or calibrating.

20 Claims, 3 Drawing Sheets

|  |  | LINE OUT 62 | | | | | | | | | | | |
|---|---|---|---|---|---|---|---|---|---|---|---|---|
|  |  | 5 | 10 | 15 | 20 | 25 | 30 | 35 | 40 | 45 | 50 | 55 | 60 |
| | 1 | 0.0 | 0.0 | 0.0 | 0.0 | 0.0 | 1.0 | 1.0 | 1.0 | 1.0 | 1.0 | 1.0 | 1.0 |
| | 2 | 0.0 | 0.0 | 1.0 | 1.0 | 1.0 | 1.0 | 1.0 | 1.0 | 2.0 | 2.0 | 2.0 | 2.0 |
| | 3 | 0.0 | 1.0 | 1.0 | 1.0 | 1.0 | 2.0 | 2.0 | 2.0 | 2.0 | 3.0 | 3.0 | 3.0 |
| | 4 | 0.0 | 1.0 | 1.0 | 1.0 | 2.0 | 2.0 | 2.0 | 3.0 | 3.0 | 3.0 | 4.0 | 4.0 |
| | 5 | 0.0 | 1.0 | 1.0 | 2.0 | 2.0 | 3.0 | 3.0 | 3.0 | 4.0 | 4.0 | 5.0 | 5.0 |
| | 6 | 1.0 | 1.0 | 2.0 | 2.0 | 3.0 | 3.0 | 4.0 | 4.0 | 5.0 | 5.0 | 6.0 | 6.0 |
| | 7 | 1.0 | 1.0 | 2.0 | 2.0 | 3.0 | 4.0 | 4.0 | 5.0 | 5.0 | 6.0 | 7.0 | 7.0 |
| | 8 | 1.0 | 1.0 | 2.0 | 3.0 | 3.0 | 4.0 | 5.0 | 6.0 | 6.0 | 7.0 | 8.0 | 8.0 |
| | 9 | 1.0 | 2.0 | 2.0 | 3.0 | 4.0 | 5.0 | 5.0 | 6.0 | 7.0 | 8.0 | 9.0 | 9.0 |
| DIVE | 10 | 1.0 | 2.0 | 3.0 | 3.0 | 4.0 | 5.0 | 6.0 | 7.0 | 8.0 | 9.0 | 10.0 | 10.0 |
| ANGLE | 11 | 1.0 | 2.0 | 3.0 | 4.0 | 5.0 | 6.0 | 7.0 | 8.0 | 9.0 | 10.0 | 10.0 | 11.0 |
| | 12 | 1.0 | 2.0 | 3.0 | 4.0 | 5.0 | 6.0 | 7.0 | 8.0 | 9.0 | 10.0 | 11.0 | 12.0 |
| 64 | 13 | 1.0 | 2.0 | 3.0 | 4.0 | 6.0 | 7.0 | 8.0 | 9.0 | 10.0 | 11.0 | 12.0 | 13.0 |
| | 14 | 1.0 | 2.0 | 4.0 | 5.0 | 6.0 | 7.0 | 8.0 | 10.0 | 11.0 | 12.0 | 13.0 | 15.0 |
| | 15 | 1.0 | 3.0 | 4.0 | 5.0 | 6.0 | 8.0 | 9.0 | 10.0 | 12.0 | 13.0 | 14.0 | 16.0 |
| | 16 | 1.0 | 3.0 | 4.0 | 6.0 | 7.0 | 8.0 | 10.0 | 11.0 | 12.0 | 14.0 | 15.0 | 17.0 |
| | 17 | 1.0 | 3.0 | 4.0 | 6.0 | 7.0 | 9.0 | 10.0 | 12.0 | 13.0 | 15.0 | 16.0 | 18.0 |
| | 18 | 2.0 | 3.0 | 5.0 | 6.0 | 8.0 | 9.0 | 11.0 | 12.0 | 14.0 | 15.0 | 17.0 | 19.0 |
| | 19 | 2.0 | 3.0 | 5.0 | 7.0 | 8.0 | 10.0 | 11.0 | 13.0 | 15.0 | 16.0 | 18.0 | 20.0 |
| | 20 | 2.0 | 3.0 | 5.0 | 7.0 | 9.0 | 10.0 | 12.0 | 14.0 | 15.0 | 17.0 | 19.0 | 21.0 |

Dive Data

| | Lure #1 | | | | |
|---|---|---|---|---|---|
| | Line Out | Dive Angle | | | |
| | 5 | 35 | | | |
| | 10 | 25 | | | |
| | 20 | 17 | | | |
| | 30 | 13 | | | |
| | 40 | 11 | | | |
| | 50 | 10 | | | |
| | 60 | 9 | | | |
| | 70 | 9 | | | |
| | 80 | 8 | | | |
| | | | | | |
| | Lure #1 | | | | |
| | Line Out | Depth | | | |
| | 5 | 2.9 | | | |
| | 10 | 4.2 | | | |
| | 20 | 5.8 | | | |
| | 30 | 6.7 | | | |
| | 40 | 7.6 | | | |
| | 50 | 8.7 | | | |
| | 60 | 9.4 | | | |
| | 70 | 11.0 | | | |
| | 80 | 11.1 | | | |

DEVICE AND METHODS OF USE FOR DETERMINING LURE DEPTH WHILE TROLLING

RELATED APPLICATIONS

The present invention claims benefit of U.S. Provisional Application 63/088,913, filed on 7 Oct. 2020 and incorporated by reference as if fully rewritten herein.

BACKGROUND OF THE INVENTION

1. Field of the Invention

The present invention relates generally to recreational fishing, especially to the method of trolling during fishing and, more particularly, to a device for determining the running depth of an artificial fishing lure while using the trolling method of presentation.

2. Description of the Related Art

Trolling is a method of fishing where one or more fishing lines, baited with lures or bait fish, are drawn through the water. This may be behind a moving boat, or by slowly winding the line in when fishing from a static position, or even sweeping the line from side-to-side, e.g., when fishing from a jetty. Trolling is used to catch pelagic fish such as salmon, mackerel and kingfish. In practice, fish swim at different depths according to factors such as the temperature and amount of light in the water, and the speed and direction of water currents.

Trolling requires control of the lure in two different vectors: speed through the water, and depth from the surface. A trolling motor may be used for controlling the speed of the boat, and in essence the speed of the lure, to move slowly through the water. The depths of the lure while trolling may be controlled by the size/weight/configuration of the lure itself, or additionally by a downrigger used to keep the lures or baits trailing at a desired depth. A downrigger is a device used to keep a bait or lure at the desired depth, and m ay consist of a one or two yard horizontal pole which supports a weight, typically about a pound of lead, on a steel cable. A clip called a "line release" attaches the fishing line to the weight, and the bait or lure is attached to the release. The fishing line is reeled in by a spool powered either by manual cranking or by an electric motor.

In practice, knowing and controlling the depth at which the downrigger controls the lure is generally through trial and error. Devices such as sonar (fish finders) exist to determine the depth of fish in relation to the sonar transducer, but in order to utilize this information it is important to know where the fishing lure is located relative to a fixed point (depth) while trolling. More importantly, knowing the depth of the fish is only one part of the problem, with the other being an ability to locate the lure at the desired depth and thereby adjust its depth.

To identify lure depth fishermen have historically developed "dive charts" that characterize the running depth of a specific lure by letting out a known length of line and observing when the rod tip is pulled down indicating the bait has hit underwater structure. At this time the fisherman denotes the sonar reading on his/her display. Many attempts are made with different line settings (amount of fishing line from rod tip to lure) to chart diving characteristics for each lure.

Limitations exist with this method, include both an inaccuracy of the method and the time required to gather the data. The inaccuracy of the traditional method of charting lure diving characteristics is due to a time delay between when the bait hits structure and where the boat is in relation to the bait at this time. For instance, if a fisherman is charting the diving characteristic of a specific lure with 60 feet of line from rod tip to lure there is a great potential that the depth of the sonar reading nearly 60 feet ahead of the lure (where the sonar is located) is reading a different depth than what exists nearly 60 feet behind the boat where the lure is located. This error can be reduced over time by denoting the minimum depth reading on the sonar while crossing over subsurface structure and noting whether the bait hits or not. This illustrates the second main problem with the traditional method of charting lure diving characteristics. This "trial and error" type method takes a lot of time to develop meaningful data.

Further, fisherman own many different types of lures all of which have unique diving characteristics. To gather the diving characteristics data for all the lures in one's tackle box takes countless hours. This data then needs to be charted physically with pen and paper or memorized in hopes to retrieve the data later when needed.

Finally, with the traditional lure diving data charting method there are numerous parameters related to the trolling presentation that can impact diving data including, inter alia, boat speed, fishing line size (diameter), and even whether or not a leader is used to protect the fishing line. All of these may affect the diving characteristics of a lure. For example, many hours can be invested in developing diving data for a lure trolled at 3 miles per hour (mph), 20# monofilament line, with no leader. However, once any one of these parameters changes the diving characteristics have the potential to change.

Consequently, a need exists for device and method for determining the running depth of an artificial fishing lure while using the trolling method of presentation.

SUMMARY OF THE INVENTION

It is thus an object of the present invention to provide an improved method of trolling during fishing and, more particularly, to a device for determining the running depth of an artificial fishing lure while using the trolling method of presentation.

It is a feature of the present invention to provide a device for determining the running depth of an artificial fishing lure while using the trolling method of presentation.

The present invention provides a device, and method of its use, to facilitate estimated, real-time diving characteristics of any fishing lure (e.g., diving plane, lure, or bait) independent of trolling parameters. The device is used when a fishing lure is being trolled behind a boat and the fishing line is pulled taut, thus creating an approximate straight line between the rod tip and lure. By measuring an angle of fishing line relative to the horizon, simple trigonometry can be used to determine the depth of the bait in relation to the rod tip. This present device is designed to measure the angle of the fishing line relative to the horizon while trolling an artificial fishing lure. The angle measured using the device is then used to aid in the calculation of the lure depth.

This present invention, once set up, uses no moving parts to measure line angle. This design is static, simple, and is not subject to mechanical failure because of this unique design concept.

Furthermore, while the core concept of the present device is simple, the use of modern technology in the form of smart cellular phone applications easily provides the calculation of depth for any amount of line out and angles measured using this device.

In addition, dive charts can be created that will allow the user to place the lure at the desired depth based on the amount of line let out from the fishing reel. This unique advantage increases the accuracy and ease of which the fisherman can strategically place his/her lure in the water with relation to depth.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The best mode for carrying out the invention is presented in terms of its preferred embodiment, herein depicted within the Figures.

1. Detailed Description of the Figures

Figure 1:
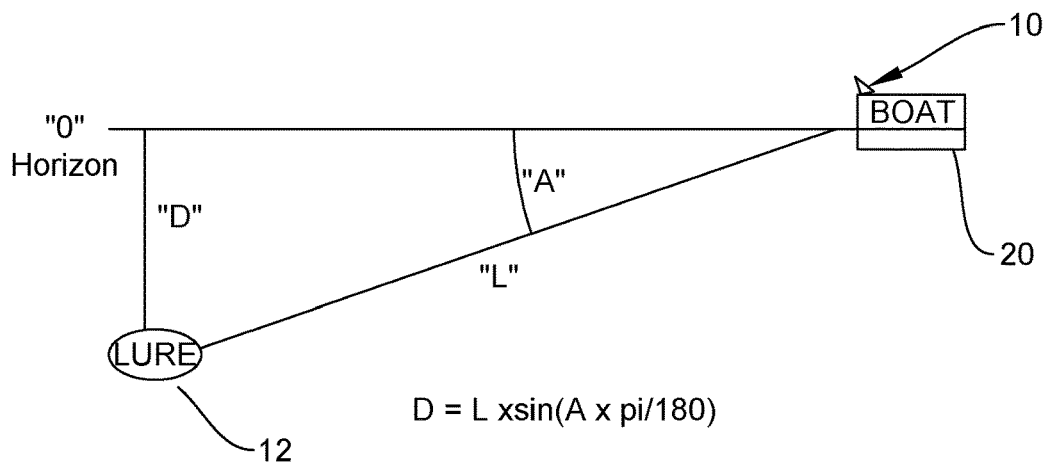
FIG. 1 depicts a basic schematic for trolling parameters for use with a preferred embodiment of the present invention.

Referring now to FIG. 1, depicts a basic schematic for trolling parameters is generally shown for use with a device for determining lure depth while trolling. The design of the instant device relies on two parameters which can be measured to calculate the depth of a lure in the water while trolling. The first parameter that can be measured is "line out". As would be apparent to one having ordinary skill in the relevant art, this parameter can be easily measured through any of a number of existing devices, including line counters either integrated into the fishing reel or "rod clip on" versions. By way of example, and not meant as a limitation, typical fishing reels having integrated line counters may include those provided by Daiwa® of Globeride, Inc. of Tokyo, Japan, or by Okuma® Fishing Tackle Co., Ltd. of Taiwan, R.O.C., or Penn® Fishing Tackle Mfg. Company of Philadelphia, Pennsylvania. Similarly, clip on style of line counters may include those provided by Berkley® or Shakespeare®, brands of Pure Fishing, Inc. of Spirit Lake, Iowa, or Rapal® provided by Normark Corporation or Minnetonka, Minnesota.

As shown in FIG. 1, the line out "L" forms a dive angle "A" with the horizon "0". A measuring device 10 of the present invention, when positioned affixed to a boat 20 measures the dive angle "A" which the line "L" makes for a specific parameter set including a given "L" value for a lure 12. Depth "D" may thereby be determined using "L" and "A" using the mathematical equation 1:

$$D = L \times \sin(A * \pi / 180) \qquad (1).$$

Figure 2:
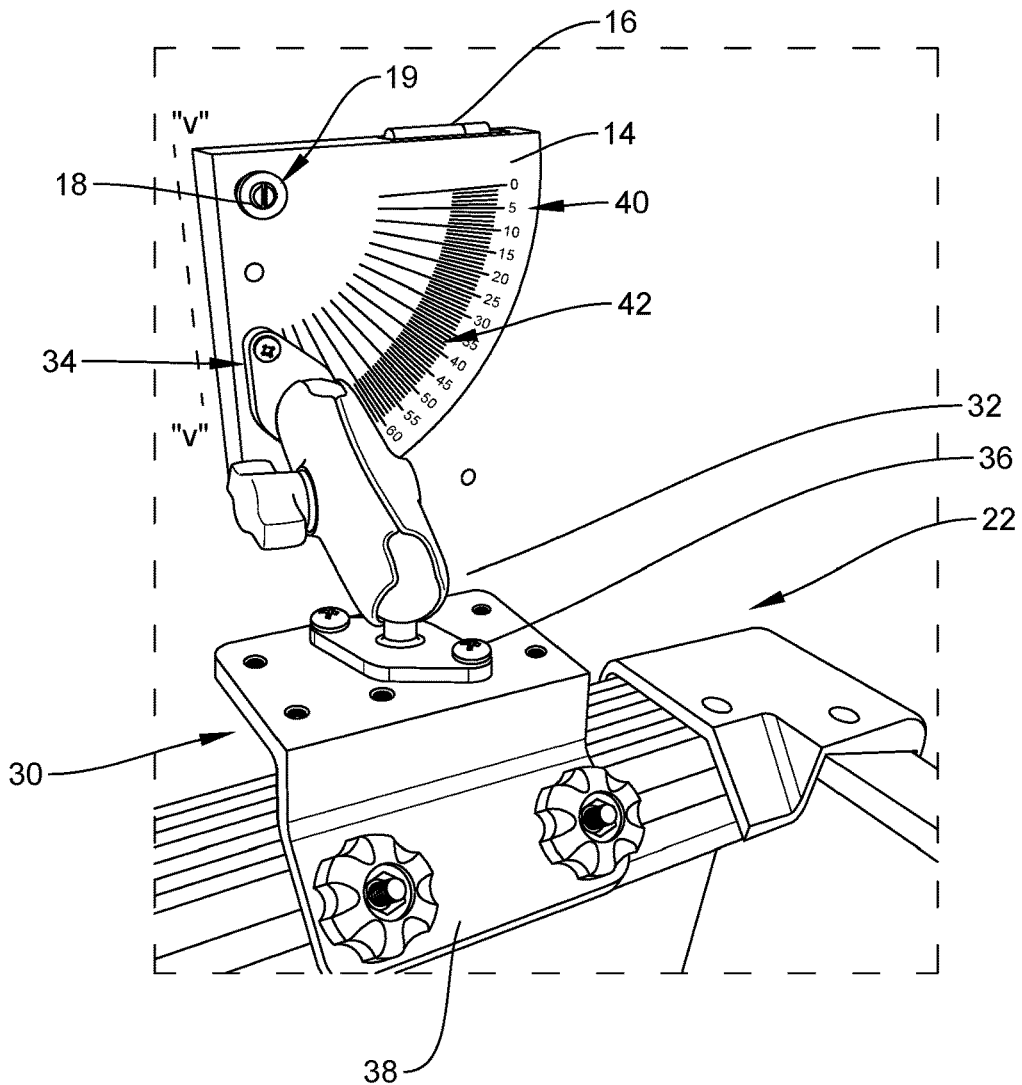
FIG. 2 is a device for determining lure depth while trolling in accordance with a preferred embodiment of the present invention.
Figures 3, 4:
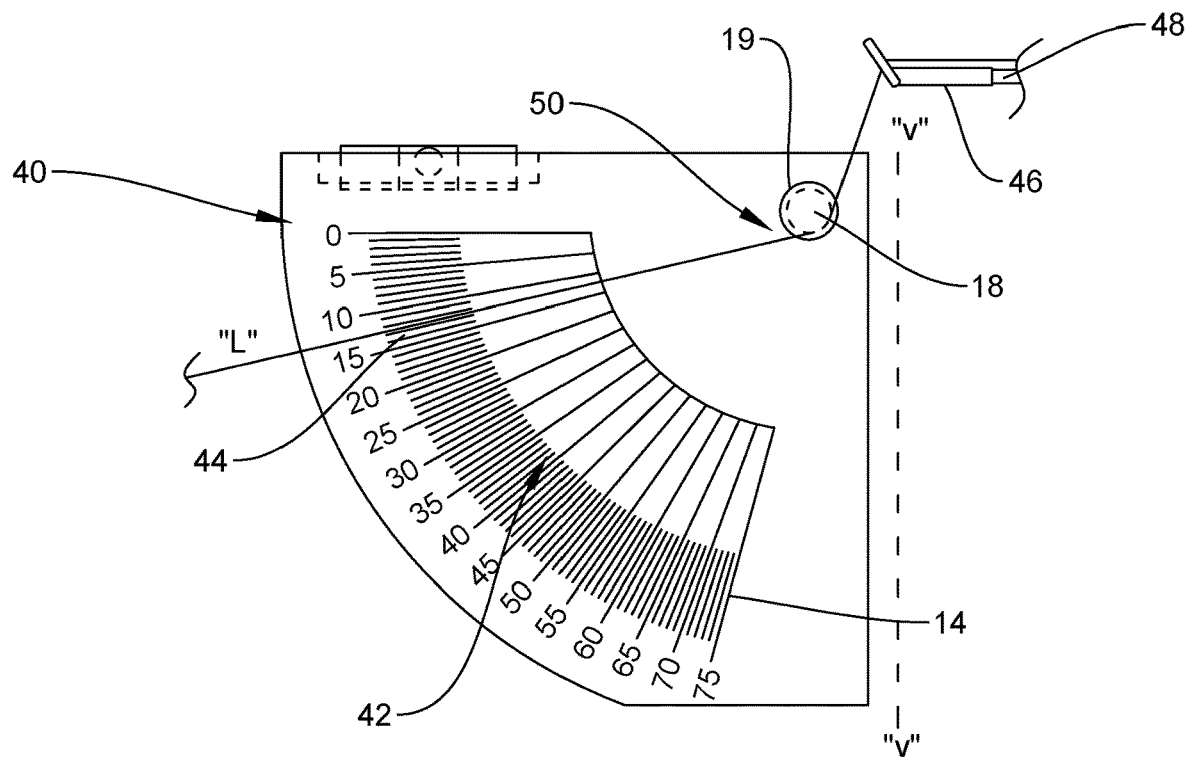
FIG. 3 is a side elevational schematic view thereof.
FIG. 4 is an exemplary view of a trigonometry chart for use therewith.

Referring now in conjunction with FIG. 2 and FIG. 3, the measuring device 10 is shown according to a preferred embodiment of the present invention. The device 10 is simple in operation and design, with minimal moving parts. The measuring device 10 consists essentially of three main design components: an angular scale 14 divided into degrees to measure a dive angle "A"; a bubble level 16; and a round flanged register pin 18. A mounting device, generally noted as 30, is adapted for affixing the level device 10 within a boat in a manner that allows for leveling or calibrating.

The mounting device 30 may consist of any hardware that allows mounting of the device to the boat structure, but must allow for rotational adjustment of the dive angle scale 14 relative to a vertical plane V-V so as to allow the "0" axis of the scale to be aligned, or calibrated, with the horizontal plane H-H. As shown, an exemplary mounting device structure is shown in which a ball and socket positioning arm 32 is included having the dive angle scale 14 pivotally affixed to the upper terminus 34 of the arm 32. At the lower terminus 36 of the positioning arm 32 may be affixed to a clamping mechanism 38, shown herein as a device adapted for deployment on the starboard gunwale 22 near the stern of the fishing boat 20. The mounting device 30 must allow for the rotation of the angle scale 14 so the "0" (zero) axis 40 can be made level with the horizon "0". Once positioned the mounting device 30 may be locked into this operational position.

The measuring device 10 may be leveled or calibrated using the bubble level 16 such that the zero axis 40 is parallel with the horizon "0". The register pin 18 provides a consistent center point for the fishing line "L" to rotate about in order to measure the dive angle "A". The register pin 18 may be flanged to ensure the fishing line "L" is retained on an outer diameter 19 of the register pin 18 while the dive angle measurement is taken. An angular scale 42 is provided formed of a plurality of aligned degree increments 44. The register pin 18 should preferably be positioned such that in relation to an angular scale 42 made such that each degree increment of 44 is tangent to the outer pin diameter 19 (and not the flanged portion) of the register pin 18.

The angular scale 42 and flanged register pin 18 may be provided on or integrated to each sides of the device so that entire assembly may be deployed on either the port and/or starboard sides of the boat.

This measuring device 10 is meant to be mounted to the transom, gunwale, or any solid structure of a boat 20, either by directly affixing the lower terminus 36 or alternately by using a mounting bracket 38. While not intended to be limiting, the materials for construction for all components and hardware may be corrosive resistant and thereby suitable for both fresh and salt water. Further, the total weight and buoyancy of the device 10 may allow for floatation in fresh and salt water.

2. Operation of the Preferred Embodiment

During the general operation of the measuring device 10, when a given length of line "L" is let out and the lure 12 is allowed to dive in the water the distal terminal rod tip 46 of a fishing rod 48 is placed just behind the register pin 18. The line is fed from below the register pin 18 and then moved vertically upward, allowing the line to engage with the register pin 18. By keeping tension on the line, the line is allowed to naturally follow the curvature of 19 around the register pin 18. The line "L" will depart from the curvature 19 at a tangent point 50.

In use the measuring device 10 may have multiple manners for determining the depth of a lure 12 while trolled behind a boat 20. According to one aspect of the present invention, a known amount of line may be let out of the fishing reel (not shown) as indicated, with the dive angle "A" being measured. This method will yield a single data point relative to the depth of the lure 12. Calculating the depth of the lure can be achieved by inputting the line out "L" and dive angle "A" data measured into the equation (1) above.

According to another aspect of the present invention, a trigonometry chart 60, as shown in conjunction with FIG. 4, may be additionally provided. The use of the chart 60 may facilitate the solving of equation (1) without manual calculations or use of a calculator. As shown, the chart 60 consists of two axes, a line out axis 62; and a dive angle axis 64. The horizontal axis 62 is line out "L" measured in feet (or any linear unit of measure). The vertical axis 64 is a dive angle "A" measured in degrees. The field of the chart is the pre-calculated values for depth "D". The user simply lets a known, or measured, amount of line out of the reel "L", uses the device 10 to measure dive angle "A", then uses the trigonometry chart 60 to determine lure depth "D". Using the trigonometry chart 60 to determine "D" is accomplished by finding the intersection where the "L" column intersects the "A" row.

An example of how the chart 60 is applied can be observed in the shaded sections of FIG. 4. In this example 40 feet of line is released from the reel, the device 10 measures a dive angle of 14 degrees, and the resultant depth of the lure is approximately 10 feet. Application of the chart 60 with this device 10 is as simple as supplying a printed chart on a thin plastic material or laminated paper to protect from water damage. In addition, a smart phone application specifically developed to automatically calculate the depth of the lure with user input of "L" and "A" can be developed.

Figure 5:
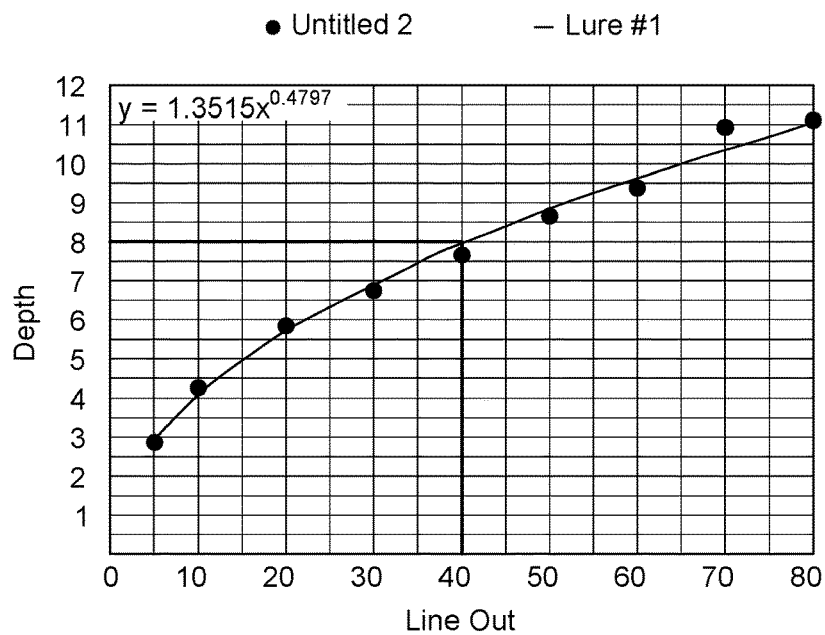
FIG. 5 is an exemplary view of a drive chart for use therewith and according to the present invention.

An alternate operation of the measuring device 20 may operate in conjunction with a sonar type device of the style used to identify depth of fish. In conjunction with such a sonar device, a user may strategically place a fishing lure at a specific depth to target these fish. Applying the first method described above could result in numerous measurement and calculation attempts before the target depth is achieved. However, used in conjunction with a sonar device the device 10 of the present invention may be used based upon a collection of data to formulate "dive charts" for a particular bait and trolling parameter set. An example of such a dive chart is shown in FIG. 5. Dive charts created using this device are more accurate and easier to formulate than when implementing the traditional method. This is due to the design and calculation of multiple data points made possible by this device.

For example, lure #1 being trolled at 3.0 mph, using a 20#monofilament fishing line, and no leader, a user may let out varying amounts of line and denote a dive angle for each "line out" condition. This data is then used to calculate the depth of each "line out"+"dive angle" combination using equation (1). The depth of the lure is a function of line out and therefore can be plotted on a graph. The line out parameter is plotted on the X-Axis and the depth is plotted on the Y-Axis. A trend line that best fits the data points can be applied to the graph using the mathematical expression $y=a*X^b$, where a and b are constants that are derived from the observed data. The user now has a "dive chart" built for Lure #1 under the specific trolling parameters identified. Using this "dive chart" graphical representation the user can locate the desired lure depth on the Y-Axis and draw a horizontal line across the graph until it intersects with the trend line. A vertical line from this point is drawn down to the X-Axis. The intersection point of the X-Axis identifies the amount of line out required to achieve the desired depth. This method can be observed in FIG. 5 and illustrates that deploying approximately 40 feet of fishing line is required to achieve a desired depth of approximately 8 feet for Lure #1.

In order to process the data required to build "dive charts" for numerous baits as well as trolling parameter scenarios, a smart phone application can be developed. A smart phone application will allow for data entry (line out and dive angle) by the user at a remote location (on board the boat) and will automatically process the data into meaningful graphical "dive charts" for immediate or future use. The application will allow for saving multiple "dive charts" in a library so that they can be accessed when called upon and used to deploy lures at specified depths while implementing the trolling presentation. It is anticipated that such data collection is best obtained on a calm day, when stability of the boat is at its greatest in order to have greater accuracy.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A measuring device for determining the depth of a trolled lure comprising:
   an angular scale divided into degrees to measure a dive angle;
   a bubble level;
   a round flanged register pin; and
   a mounting device adapted for affixing the measuring device within a boat in a manner that allows for leveling or calibrating.

2. The measuring device of claim 1, wherein said mounting device allows for attachment to a boat structure in a manner allowing for rotational adjustment of the dive angle scale relative to a vertical plane.

3. The measuring device of claim 2, wherein said mounting device further comprises a ball and socket positioning arm having the dive angle scale pivotally affixed to an upper terminus and a clamping mechanism at a lower terminus; wherein the mounting device allows for a rotation of the angle scale between a vertical and a horizon.

4. The measuring device of claim 1, wherein the angle scale is leveled or calibrated using the bubble level such that a zero axis is parallel with a horizon.

5. The measuring device of claim 2, wherein the angle scale is leveled or calibrated using the bubble level such that a zero axis is parallel with a horizon.

6. The measuring device of claim 3, wherein the angle scale is leveled or calibrated using the bubble level such that a zero axis is parallel with a horizon.

7. The measuring device of claim 4, wherein the register pin comprises a center point for a fishing line to rotate about in order to measure a dive angle "A".

8. The measuring device of claim 5, wherein the register pin comprises a center point for a fishing line to rotate about in order to measure a dive angle "A".

9. The measuring device of claim 6, wherein the register pin comprises a center point for a fishing line to rotate about in order to measure a dive angle "A".

10. The measuring device of claim 7, wherein the register pin further comprises a flange to ensure the fishing line is retained on an outer diameter of the register pin while the dive angle measurement is taken.

11. The measuring device of claim 8, wherein the register pin further comprises a flange to ensure the fishing line is retained on an outer diameter of the register pin while the dive angle measurement is taken.

12. The measuring device of claim 9, wherein the register pin further comprises a flange to ensure the fishing line is retained on an outer diameter of the register pin while the dive angle measurement is taken.

13. The measuring device of claim 1, further comprising:
   a second angular scale opposite the angular scale; and
   a second register pin opposite the register pin;
   wherein the measuring device is thereby adapted to be deployed on either a port side or a starboard sides of a boat.

14. The measuring device of claim 2, further comprising:
   a second angular scale opposite the angular scale; and
   a second register pin opposite the register pin;
   wherein the measuring device is thereby adapted to be deployed on either a port side or a starboard sides of a boat.

15. The measuring device of claim 3, further comprising:
   a second angular scale opposite the angular scale; and
   a second register pin opposite the register pin;
   wherein the measuring device is thereby adapted to be deployed on either a port side or a starboard sides of a boat.

16. The measuring device of claim 6, further comprising:
   a second angular scale opposite the angular scale; and
   a second register pin opposite the register pin;
   wherein the measuring device is thereby adapted to be deployed on either a port side or a starboard sides of a boat.

17. The measuring device of claim 10, further comprising:
   a second angular scale opposite the angular scale; and
   a second register pin opposite the register pin;
   wherein the measuring device is thereby adapted to be deployed on either a port side or a starboard sides of a boat.

18. A method of method for determining the running depth of an artificial fishing lure being trolled behind a boat comprising the steps:
   a. letting out a known length of line between a rod tip and the artificial artificial fishing lure;
   b. pulling the known length of line taut;
   c. measuring a dive angle between a horizontal and the known length of line using a measuring device of claim 1;
   d. determining a depth "D" using an equation $$D = (\text{known length of line}) \times \sin((\text{dive angle}) * \pi/180).$$

19. A method of method for determining the running depth of an artificial fishing lure being trolled behind a boat comprising the steps:
   a. letting out a known length of line between a rod tip and the artificial fishing lure;
   b. pulling the known length of line taut;
   c. measuring a dive angle between a horizontal and the known length of line using a measuring device of claim 1;
   d. determining a running depth "D" using a historically developed dive chart that characterizes the running depth "D" of the artificial lure compared to the known length of line, and in which the running depth "D" is determined using the equation $$D = (\text{known length of line}) \times \sin((\text{dive angle}) * \pi/180).$$

20. The method of claim 19, wherein said historically developed dive chart is created and used through a smart phone application.

* * * * *